US012620368B2

(12) United States Patent
Mazrouei et al.

(10) Patent No.: US 12,620,368 B2
(45) Date of Patent: May 5, 2026

(54) CIRCUIT APPARATUS AND DISPLAY SYSTEM HAVING DIFFERENT ATTENUATION FACTOR DISTRIBUTIONS OF BACKLIGHT SOURCE LUMINANCE

(71) Applicant: SEIKO EPSON CORPORATION, Tokyo (JP)

(72) Inventors: Sebdani mahmood Mazrouei, Markham (CA); Kwok lap jimmy Lai, Vancouver (CA); Kumar anandabairavasamy Anand, Richmond (CA)

(73) Assignee: SEIKO EPSON CORPORATION (JP)

( * ) Notice: Subject to any disclaimer, the term of this patent is extended or adjusted under 35 U.S.C. 154(b) by 26 days.

(21) Appl. No.: 18/618,112

(22) Filed: Mar. 27, 2024

(65) Prior Publication Data

US 2024/0331648 A1 Oct. 3, 2024

(30) Foreign Application Priority Data

Mar. 28, 2023 (JP) ................................ 2023-051048

(51) Int. Cl.
*G09G 3/34* (2006.01)

(52) U.S. Cl.
CPC ... *G09G 3/3426* (2013.01); *G09G 2320/0242* (2013.01); *G09G 2320/0257* (2013.01); *G09G 2320/0626* (2013.01); *G09G 2360/16* (2013.01)

(58) Field of Classification Search
None
See application file for complete search history.

(56) References Cited

U.S. PATENT DOCUMENTS 10,867,578 B2 * 12/2020 Chen .................... G09G 3/2003
2010/0220048 A1 9/2010 Yamamura et al.
(Continued)

FOREIGN PATENT DOCUMENTS

JP 2012-516458 A 7/2012
JP 2021-101199 A 7/2021
JP 2022-073049 A 5/2022

*Primary Examiner* — Donna V Bocar
(74) *Attorney, Agent, or Firm* — Harness, Dickey & Pierce, P.L.C.

(57) ABSTRACT

A circuit apparatus includes a storage unit and a light source luminance determination circuit. The storage unit stores a plurality of pieces of attenuation factor distribution information indicating an attenuation factor distribution of light with respect to a distance between a light source element and a pixel. The light source luminance determination circuit determines, by light adjustment processing based on input image data and the plurality of pieces of attenuation factor distribution information, light source luminance information indicating luminance of light emitted by each light source element of a plurality of light source elements. In a first mode, the light source luminance determination circuit determines the light source luminance information based on the input image data and first attenuation factor distribution information among the plurality of pieces of attenuation factor distribution information. In a second mode, the light source luminance determination circuit determines the light source luminance information based on the input image data and second attenuation factor distribution information in which the attenuation factor distribution is different from that in the first attenuation factor distribution information among the plurality of pieces of attenuation factor distribution information.

20 Claims, 12 Drawing Sheets

(56) References Cited

U.S. PATENT DOCUMENTS

| | | | | |
|---|---|---|---|---|
| 2010/0238189 | A1 | 9/2010 | Feng | |
| 2010/0289833 | A1* | 11/2010 | Budzelaar | G09G 3/3426 345/102 |
| 2011/0316829 | A1* | 12/2011 | Oka | G09G 3/3426 345/207 |
| 2012/0139975 | A1 | 6/2012 | Hashimoto et al. | |
| 2017/0336676 | A1* | 11/2017 | Harada | G09G 3/2022 |
| 2018/0081248 | A1* | 3/2018 | Kitamura | G02F 1/134363 |
| 2021/0193066 | A1 | 6/2021 | Anand et al. | |
| 2021/0390916 | A1* | 12/2021 | Shi | G09G 3/342 |

* cited by examiner

FIG. 3

LUTA: $lsf^0$

LUTA1

| INDEX | $(DISTANCE)^2$ |
|---|---|
| 0 | 0 |
| 1 | 100 |
| 2 | 400 |
| 3 | 900 |
| 4 | 1600 |
| 5 | 2500 |
| 6 | 3600 |
| 7 | 4900 |
| 8 | 6400 |
| 9 | 8100 |
| 10 | 10000 |

LUTA2

| INDEX | ATTENUATION FACTOR |
|---|---|
| 0 | 100.0 |
| 1 | 100.0 |
| 2 | 100.0 |
| 3 | 100.0 |
| 4 | 100.0 |
| 5 | 100.0 |
| 6 | 100.0 |
| 7 | 100.0 |
| 8 | 100.0 |
| 9 | 100.0 |
| 10 | 100.0 |

FIG. 5

LUTB: lsf[1]

LUTB1

| INDEX | $(DISTANCE)^2$ |
|---|---|
| 0 | 0 |
| 1 | 100 |
| 2 | 400 |
| 3 | 900 |
| 4 | 1600 |
| 5 | 2500 |
| 6 | 3600 |
| 7 | 4900 |
| 8 | 6400 |
| 9 | 8100 |
| 10 | 10000 |

LUTB2

| INDEX | ATTENUATION FACTOR |
|---|---|
| 0 | 100.0 |
| 1 | 93.9 |
| 2 | 77.9 |
| 3 | 57.0 |
| 4 | 36.8 |
| 5 | 21.0 |
| 6 | 10.5 |
| 7 | 4.7 |
| 8 | 1.8 |
| 9 | 0.6 |
| 10 | 0.2 |

FIG. 7

LUTC: $lsf^2$

LUTC1

| INDEX | $(DISTANCE)^2$ |
|---|---|
| 0 | 0 |
| 1 | 100 |
| 2 | 400 |
| 3 | 900 |
| 4 | 1600 |
| 5 | 2500 |
| 6 | 3600 |
| 7 | 4900 |
| 8 | 6400 |
| 9 | 8100 |
| 10 | 10000 |

LUTC2

| INDEX | ATTENUATION FACTOR |
|---|---|
| 0 | 100.0 |
| 1 | 88.2 |
| 2 | 60.7 |
| 3 | 32.5 |
| 4 | 13.5 |
| 5 | 4.4 |
| 6 | 1.1 |
| 7 | 0.2 |
| 8 | 0.0 |
| 9 | 0.0 |
| 10 | 0.0 |

FIG. 9

| y DISTANCE | x DISTANCE 0 | 10 | 20 | 30 | 40 | 50 | 60 | 70 | 80 | 90 | 100 |
|---|---|---|---|---|---|---|---|---|---|---|---|
| 0 | 100.0 | 96.1 | 85.2 | 69.8 | 52.7 | 36.8 | 23.7 | 14.1 | 7.7 | 3.9 | 1.8 |
| 10 | 96.1 | 92.3 | 81.9 | 67.0 | 50.7 | 35.3 | 22.8 | 13.5 | 7.4 | 3.8 | 1.8 |
| 20 | 85.2 | 81.9 | 72.6 | 59.5 | 44.9 | 31.3 | 20.2 | 12.0 | 6.6 | 3.3 | 1.6 |
| 30 | 69.8 | 67.0 | 59.5 | 48.7 | 36.8 | 25.7 | 16.5 | 9.8 | 5.4 | 2.7 | 1.3 |
| 40 | 52.7 | 50.7 | 44.9 | 36.8 | 27.8 | 19.4 | 12.5 | 7.4 | 4.1 | 2.1 | 1.0 |
| 50 | 36.8 | 35.3 | 31.3 | 25.7 | 19.4 | 13.5 | 8.7 | 5.2 | 2.8 | 1.4 | 0.7 |
| 60 | 23.7 | 22.8 | 20.2 | 16.5 | 12.5 | 8.7 | 5.6 | 3.3 | 1.8 | 0.9 | 0.4 |
| 70 | 14.1 | 13.5 | 12.0 | 9.8 | 7.4 | 5.2 | 3.3 | 2.0 | 1.1 | 0.6 | 0.3 |
| 80 | 7.7 | 7.4 | 6.6 | 5.4 | 4.1 | 2.8 | 1.8 | 1.1 | 0.6 | 0.3 | 0.1 |
| 90 | 3.9 | 3.8 | 3.3 | 2.7 | 2.1 | 1.4 | 0.9 | 0.6 | 0.3 | 0.2 | 0.1 |
| 100 | 1.8 | 1.8 | 1.6 | 1.3 | 1.0 | 0.7 | 0.4 | 0.3 | 0.1 | 0.1 | 0.0 |

CIRCUIT APPARATUS AND DISPLAY SYSTEM HAVING DIFFERENT ATTENUATION FACTOR DISTRIBUTIONS OF BACKLIGHT SOURCE LUMINANCE

The present application is based on, and claims priority from JP Application Serial Number 2023-051048, filed Mar. 28, 2023, the disclosure of which is hereby incorporated by reference herein in its entirety.

BACKGROUND

1. Technical Field

The present disclosure relates to a circuit apparatus, a display system, and the like.

2. Related Art

JP-T-2012-516458 discloses a backlight type display apparatus in which a drive value of an LED is changed to reduce a rapid backlight change in a dark area in order to avoid or reduce an artifact caused by a halo effect.

JP-T-2012-516458 is an example of the related art.

SUMMARY

By reducing luminance of a light-emitting element that emits light to a display panel, halo caused by the light is reduced. However, since there is a trade-off between the reduction of halo and the reduction of luminance for illuminating the display panel, light adjustment may not be optimal for display contents, an environment, or the like.

An aspect of the disclosure relates to a circuit apparatus that controls a display apparatus including a plurality of light source elements and a display panel, the circuit apparatus including: a storage unit configured to store a plurality of pieces of attenuation factor distribution information indicating an attenuation factor distribution of light with respect to a distance between each of the light source elements and a pixel; and a light source luminance determination circuit configured to determine, by light adjustment processing based on input image data and the plurality of pieces of attenuation factor distribution information, light source luminance information indicating luminance of light emitted by each light source element of the plurality of light source elements, in which, in a first mode, the light source luminance determination circuit determines the light source luminance information based on the input image data and first attenuation factor distribution information among the plurality of pieces of attenuation factor distribution information, and, in a second mode, the light source luminance determination circuit determines the light source luminance information based on the input image data and second attenuation factor distribution information in which the attenuation factor distribution is different from that in the first attenuation factor distribution information among the plurality of pieces of attenuation factor distribution information.

Another aspect of the disclosure relates to a display system including the circuit apparatus and the display apparatus.

BRIEF DESCRIPTION OF THE DRAWINGS

FIG. 3 is an example of a look-up table LUTA.

FIG. 5 is an example of a look-up table LUTB.

FIG. 7 is an example of a look-up table LUTC.

FIG. 9 is an example of a two-dimensional look-up table.

DESCRIPTION OF EMBODIMENTS

Hereinafter, a preferred embodiment of the disclosure will be described in detail. The embodiment described below does not unduly limit the contents of the claims, and not all of the configurations described in the embodiment are essential configuration requirements.

1. Electronic Device, Display System, and Circuit Apparatus

Figure 1:
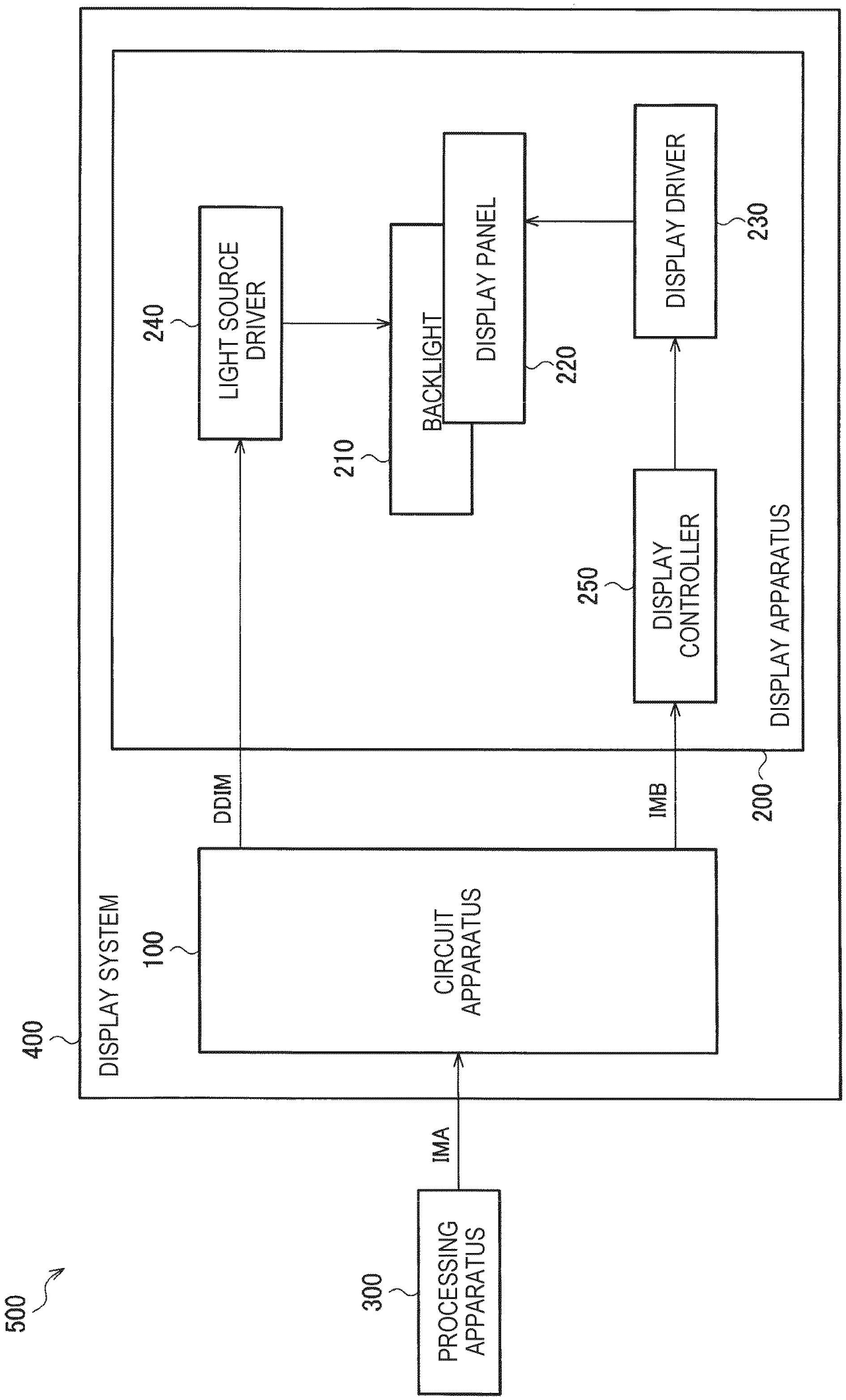
FIG. 1 is a configuration example of an electronic device.

FIG. 1 is a configuration example of an electronic device including a display system according to the embodiment. An electronic device 500 includes a processing apparatus 300 and a display system 400. The electronic device 500 is, for example, an in-vehicle display device including a meter panel, a center information display, a head-up display, or an electronic mirror, a television apparatus, or an information processing apparatus including a display.

The display system 400 includes a circuit apparatus 100 and a display apparatus 200. The circuit apparatus 100 is, for example, an integrated circuit apparatus in which a plurality of circuit elements are integrated on a semiconductor substrate. The circuit apparatus 100 and the display apparatus 200 are shown as separate components in FIG. 1, and alternatively, the circuit apparatus 100 may be provided in the display apparatus 200.

The display apparatus 200 includes a backlight 210, a display panel 220, a display driver 230, a light source driver 240, and a display controller 250. An example of the display apparatus 200 is a display used in a television apparatus, an information processing apparatus, or the like. Alternatively, the display apparatus 200 may be a head-mounted display including a projection apparatus for eyes, a head-up display including a projection apparatus for a screen, or the like. When the display apparatus 200 is a head-up display, the display apparatus 200 further includes an optical system for projecting light, which is emitted from the backlight 210 and transmitted through the display panel 220, onto a screen.

In a plan view of the backlight 210, light source elements are two-dimensionally disposed in the backlight 210. Each light source element is a light-emitting element that emits light by electric power supply, and is, for example, an inorganic light-emitting diode or an organic light-emitting diode. In local dimming control, a light quantity of each of the light source elements disposed two-dimensionally is independently controlled. Alternatively, the backlight 210 may be divided into a plurality of areas. In a plan view, a plurality of light source elements are disposed in each area. The light source elements disposed in the area are controlled to have the same light quantity, and a light quantity of each area is independently controlled.

An example of a two-dimensional disposition of the light source elements is a square disposition in which the light source elements are disposed at all intersections of a plurality of rows and a plurality of columns. However, the two-dimensional disposition is not limited to the square disposition. For example, the two-dimensional disposition may be a disposition called a rhombus disposition or a zigzag disposition. In such a disposition, the light source elements are disposed at intersections of one of an odd row and an even row with an odd column, and intersections of the other of the odd row and the even row with an even column, and no light source element is disposed at other intersections.

The light source driver 240 receives light source luminance data DDIM from the circuit apparatus 100, and drives each light source element of the backlight 210 based on the light source luminance data DDIM. The light source driver 240 is, for example, an integrated circuit apparatus. A plurality of light source drivers may be provided, and each of the light source drivers may be a separate integrated circuit apparatus.

The display panel 220 is an electro-optical panel that transmits light from the backlight 210 and displays an image by controlling a transmittance thereof. For example, the display panel 220 is a liquid crystal display panel.

The display controller 250 receives image data IMB from the circuit apparatus 100, and transmits the image data IMB and a timing control signal for controlling a display timing to the display driver 230. The display controller 250 may perform image processing such as tone correction, white balance correction, or enlargement and reduction on the received image data IMB.

The display driver 230 displays an image on the display panel 220 by driving the display panel based on the received image data and the timing control signal. The display controller 250 and the display driver 230 may be implemented by separate integrated circuit apparatuses, or may be implemented integrally by an integrated circuit apparatus.

The processing apparatus 300 transmits image data IMA to the circuit apparatus 100. The processing apparatus 300 is a processor such as a CPU, a GPU, a microcomputer, a DSP, an ASIC, or an FPGA. The CPU is an abbreviation for a central processing unit. The GPU is an abbreviation for a graphics processing unit. The DSP is an abbreviation for a digital signal processor. The ASIC is an abbreviation for an application specific integrated circuit. The FPGA is an abbreviation for a field programmable gate array.

The circuit apparatus 100 receives the image data IMA and performs local dimming control of the display apparatus 200 based on the image data IMA. The circuit apparatus 100 adjusts light emission luminance of each light source element of the backlight 210 or each area according to luminance of the image data IMA, and outputs light source luminance information obtained by the light adjustment as the light source luminance data DDIM to the light source driver 240. The circuit apparatus 100 performs color correction on the image data IMA based on the light source luminance information and outputs the image data IMB after the color correction to the display controller 250.

Figure 2:
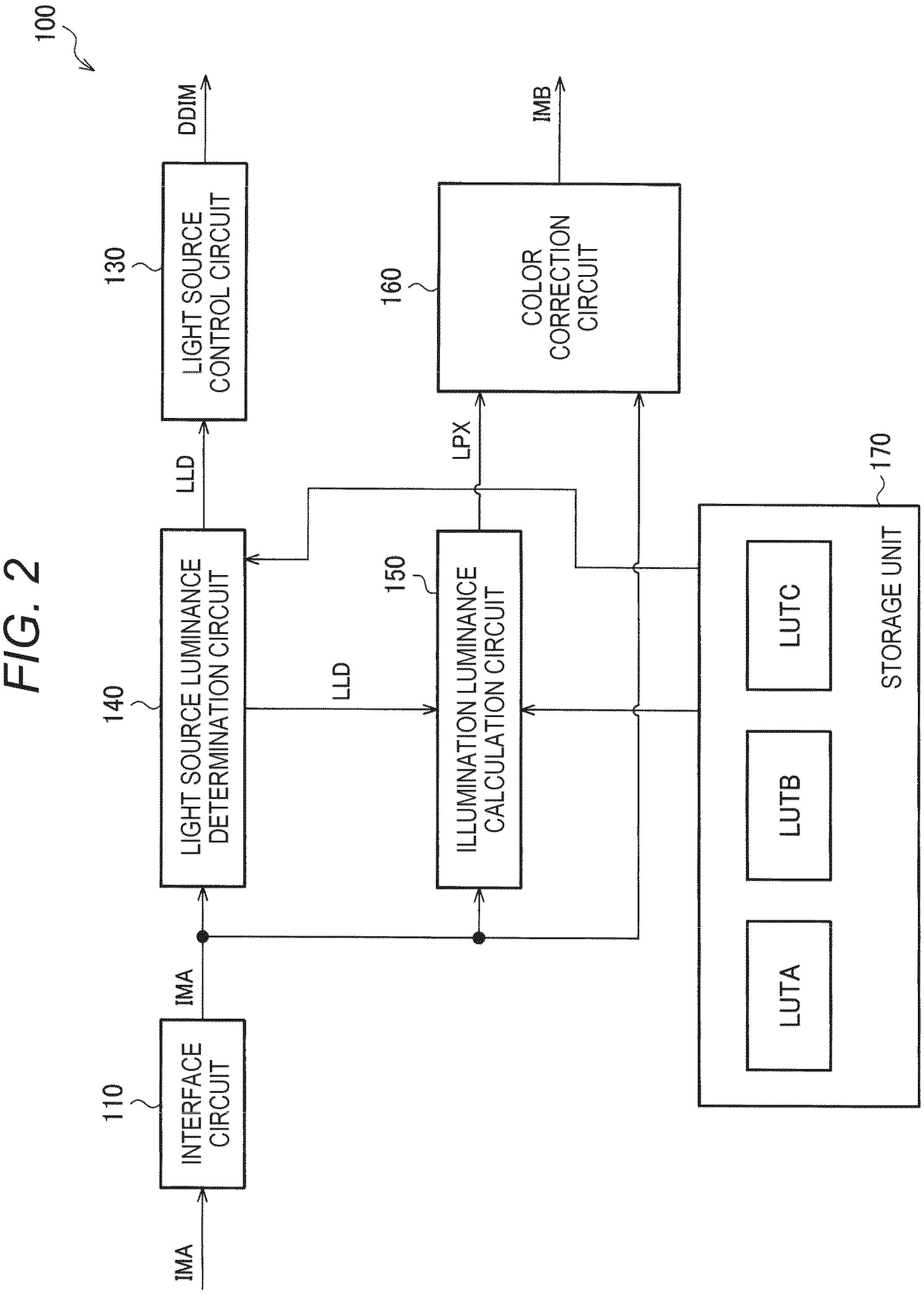
FIG. 2 is a detailed configuration example of a circuit apparatus.

FIG. 2 is a detailed configuration example of the circuit apparatus. The circuit apparatus 100 includes an interface circuit 110, a light source control circuit 130, a light source luminance determination circuit 140, an illumination luminance calculation circuit 150, a color correction circuit 160, and a storage unit 170. Hereinafter, a case where light is independently adjusted for each light-emitting element of the backlight 210 in local dimming will be described as an example, and alternatively, light may be independently adjusted for each area including a plurality of light-emitting elements.

The interface circuit 110 receives the image data IMA from the processing apparatus 300. The interface circuit 110 may be an interface circuit of various image interface methods such as LVDS, a parallel RGB method, or a display port. The LVDS is an abbreviation for low voltage differential signaling.

The storage unit 170 stores, as attenuation factor distribution information, a look-up table indicating an attenuation factor distribution of light reaching the display panel from the light source element. FIG. 2 shows an example in which the storage unit 170 stores three types of look-up tables LUTA, LUTB, and LUTC having different attenuation factor distributions. However, the number of look-up tables may be two or more. The attenuation factor distribution indicates a relationship between a distance from the light source element to a pixel and an attenuation factor of light with which the light source element illuminates the pixel. The attenuation factor distribution is also referred to as an attenuation characteristic or a luminance distribution. The storage unit 170 is a register or a memory. The memory is a volatile memory such as a RAM or a non-volatile memory such as an OTP memory or an EEPROM. The RAM is an abbreviation for a random access memory. The OTP is an abbreviation for one time programmable. The EEPROM is an abbreviation for an electrically erasable programmable read only memory.

The image data IMA is input from the interface circuit 110 to the light source luminance determination circuit 140. The image data IMA input to the light source luminance determination circuit 140 is also referred to as input image data. The light source luminance determination circuit 140 reads, from the storage unit 170, a look-up table corresponding to a mode among the look-up tables LUTA, LUTB, and LUTC. For example, the processing apparatus 300 writes a mode setting into the storage unit 170, or the mode setting is written in advance in a non-volatile memory of the storage unit 170. The light source luminance determination circuit 140 reads the mode setting from the storage unit 170 and reads a look-up table corresponding to the mode setting. The light source luminance determination circuit 140 determines light source luminance information indicating light emission luminance of each light source element by performing light adjustment processing using the image data IMA and the look-up table read from the storage unit 170, and outputs the light source luminance information as light source luminance data LLD.

Settable modes include a halo reduction mode. Halo is a phenomenon in which light bleeds into a dark portion around a bright portion in a high-contrast image. Since the light source element behind the bright portion emits light with high luminance, the light leaks from the surrounding dark portion and causes halo. The halo reduction mode is a mode in which halo reduction is emphasized in view of a balance between display luminance and halo reduction. The settable modes also include a high luminance mode. The high luminance mode is a mode in which the display luminance is emphasized in view of the balance between the display luminance and the halo reduction. The settable modes may further include a balanced mode. The balanced mode is an intermediate mode between the halo reduction mode and the high luminance mode and is a mode in which the balance between the display luminance and the halo reduction is emphasized. The look-up tables corresponding to the respective modes have different attenuation factor distributions. It is possible to freely program what attenuation factor distribution is used corresponding to each mode. A specific example of each look-up table will be described later.

The light source control circuit 130 controls the light source driver 240 based on the light source luminance data LLD. Specifically, the light source control circuit 130 outputs a timing control signal for controlling a light emission timing of the light-emitting element or an update timing of the light emission luminance to the light source driver 240, and outputs the light source luminance data LLD as the light source luminance data DDIM to the light source driver 240. The light source driver 240 drives, at a timing defined by the timing control signal, each light-emitting element by a PWM signal having a pulse width corresponding to the light emission luminance of each light source element indicated by the light source luminance data DDIM. Accordingly, each light-emitting element emits light with the light emission luminance controlled by local dimming.

The illumination luminance calculation circuit 150 reads, from the storage unit 170, a look-up table used for calculating illumination luminance among the look-up tables LUTA, LUTB, and LUTC. The look-up table used for calculating the illumination luminance may also be prepared separately from the look-up tables LUTA, LUTB, and LUTC corresponding to the modes. The illumination luminance calculation circuit 150 calculates illumination luminance information based on the light source luminance data LLD and the look-up table read from the storage unit 170, and outputs the illumination luminance information as illumination luminance data LPX. The illumination luminance information indicates illumination luminance of each pixel of the display panel 220 when the display panel 220 is illuminated by the backlight 210.

The color correction circuit 160 performs color correction on the image data IMA based on the illumination luminance data LPX and outputs the corrected image data IMB to the display driver 230. Specifically, the color correction circuit 160 multiplies pixel data of each pixel by a reciprocal of luminance of light reaching the pixel and uses a result thereof as new pixel data of the pixel.

The light source control circuit 130, the light source luminance determination circuit 140, the illumination luminance calculation circuit 150, and the color correction circuit 160 are logic circuits that process digital signals. The light source control circuit 130, the light source luminance determination circuit 140, the illumination luminance calculation circuit 150, and the color correction circuit 160 may be implemented by separate logic circuits, or a part or all thereof may be implemented by an integrated logic circuit. Alternatively, a processor such as a DSP may execute an instruction set or a program describing functions of the light source control circuit 130, the light source luminance determination circuit 140, the illumination luminance calculation circuit 150, and the color correction circuit 160 to implement the functions of the circuits.

Alternatively, the circuit apparatus 100 may be a processor such as a CPU, a GPU, a microcomputer, a DSP, an ASIC, or an FPGA. A function of the circuit apparatus 100 may be implemented by the processor executing an instruction set or a program describing the function of each unit of the circuit apparatus 100.

The circuit apparatus 100 may include a distortion correction circuit. The distortion correction circuit corrects image distortion caused by an optical system that projects an image displayed on the display panel 220 onto a screen or the like, or image distortion caused by screen distortion. Specifically, the distortion correction circuit performs image correction for canceling or reducing the image distortion on the image data IMA received by the interface circuit 110 and outputs the corrected image data to the light source luminance determination circuit 140, the illumination luminance calculation circuit 150, and the color correction circuit 160. However, the distortion correction circuit may be provided in the processing apparatus 300 instead of the circuit apparatus 100.

An example in which the attenuation factor distribution information is the look-up table is described above, and the attenuation factor distribution information may be any information indicating the attenuation factor distribution. The attenuation factor distribution information may be, for example, a function indicating the attenuation factor distribution. An argument of the function is a distance, and a return value is an attenuation factor. The storage unit 170 stores function information defining the function, and the light source luminance determination circuit 140 and the illumination luminance calculation circuit 150 obtain an attenuation factor by inputting a distance into the function defined by the function information. The function information is, for example, a coefficient used for the function. An example in which the attenuation factor distribution information is a look-up table will be described later.

An example in which a plurality of discrete modes are used is described above, and alternatively, a continuously settable mode may be used. For example, the mode may be continuously settable between the halo reduction mode and the high luminance mode. The attenuation factor distribution information is, as an example, a function, and a coefficient of the function continuously changes according to the continuous mode. An example in which a plurality of discrete modes are used will be described later.

2. Light Source Luminance Determination Circuit

Hereinafter, details of processing performed by the light source luminance determination circuit 140 will be described. First, examples of the look-up tables LUTA, LUTB, and LUTC are shown. The look-up tables LUTA, LUTB, and LUTC output, with respect to input distance information, attenuation factor information associated with the distance information. Hereinafter, an example in which the distance information is a square of a distance and the attenuation factor information is an attenuation factor expressed as a percentage of 100 will be described, but the disclosure is not limited thereto. The distance information may be a distance, the number of pixels, or the like. The attenuation factor information may be an attenuation factor represented in any unit.

Figure 4:
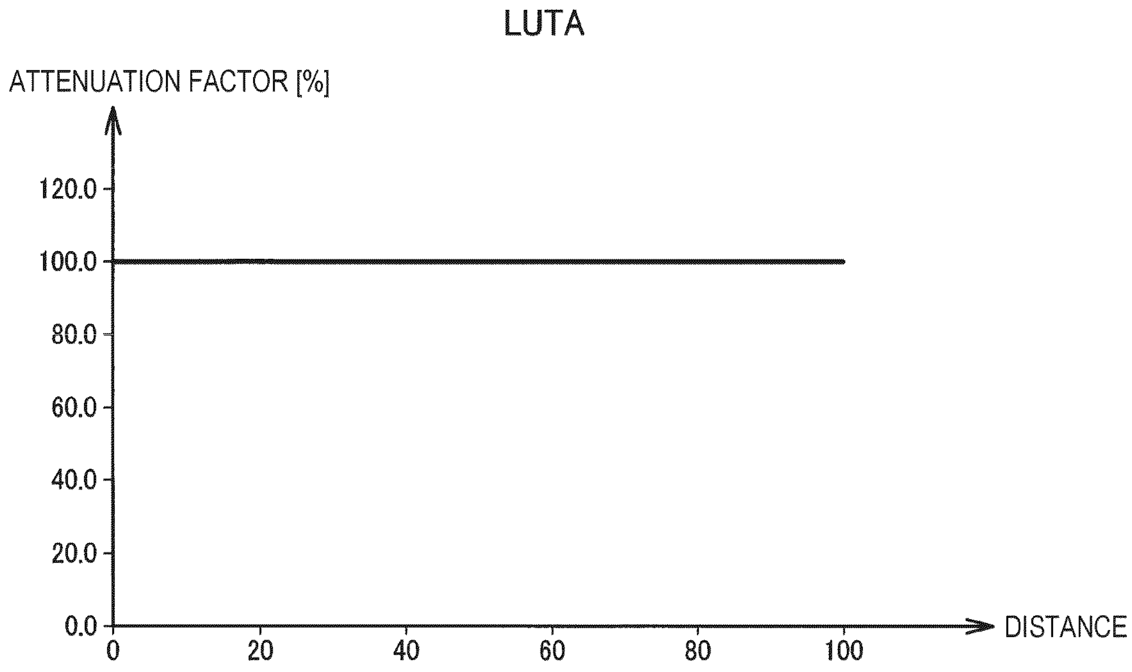
FIG. 4 is an example of an attenuation factor distribution in the look-up table LUTA.

FIG. 3 is an example of the look-up table LUTA. The look-up table LUTA is a table of an attenuation factor distribution $lsf^0$. Here, an exponent on a right upper side of lsf means exponentiation of lsf. FIG. 4 is an example of an attenuation factor distribution in the look-up table LUTA.

Light from the light source element is diffused by a diffusion sheet or the like, and the diffused light is emitted to the display panel. At this time, a luminance distribution of the light due to the diffusion is an attenuation factor distribution. However, an attenuation factor distribution used for calculating light source luminance may not be an actual attenuation factor distribution, and may be a virtual attenuation factor distribution programmed for calculating the light source luminance. FIGS. 3 and 4 show an example of an attenuation factor distribution having a flat characteristic.

As shown in FIG. 3, the look-up table LUTA includes a look-up table LUTA1 storing the square of the distance and a look-up table LUTA2 storing the attenuation factor.

Each index in the look-up table LUTA1 stores a square of a distance associated with the index. Here, an example in which the index is 0 to 10 is shown, but the index may be any number. In addition, an example in which the distance is marked at equal intervals in a range of 0 to 100 is shown, but the range of the distance may be any range, and intervals between marks may not be equal. The index is, for example, a memory address.

Each index in the look-up table LUTA2 stores an attenuation factor associated with the index. The attenuation factor is represented by a value normalized with maximum luminance being 100%. In the attenuation factor distribution $lsf^0$, the attenuation factor of all indexes is 100%.

For example, when the square of the distance is 300, the light source luminance determination circuit 140 sequentially reads squares of distances of the respective indexes from the look-up table LUTA1 and compares the squares with 300 to determine indexes 1 and 2 corresponding to 100 and 400 sandwiching 300. The light source luminance determination circuit 140 reads the attenuation factors 100% and 100% of the indexes 1 and 2 from the look-up table LUTA2 and obtains an attenuation factor corresponding to the square 300 of the distance by interpolation. Here, since the distribution characteristic is flat, the attenuation factor after interpolation is 100%.

Figure 6:
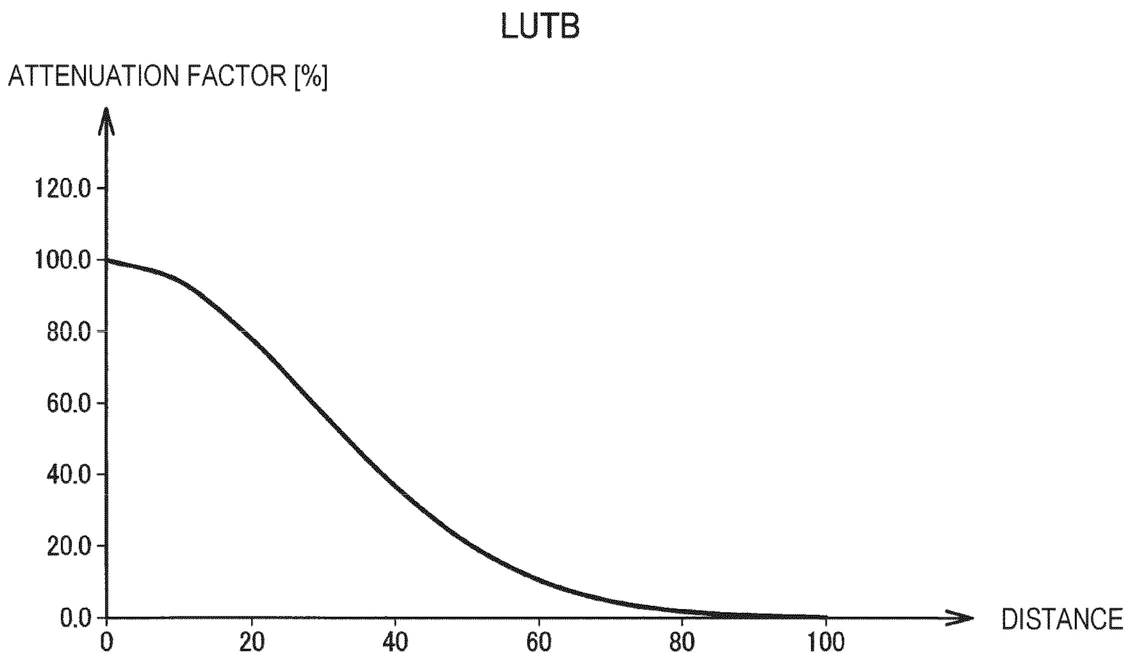
FIG. 6 is an example of an attenuation factor distribution in the look-up table LUTB.

FIG. 5 is an example of the look-up table LUTB. The look-up table LUTB is a table of an attenuation factor distribution $lsf^1$. FIG. 6 is an example of an attenuation factor distribution in the look-up table LUTB. The attenuation factor distribution $lsf^1$ is, for example, an actual attenuation factor distribution or an attenuation factor distribution approximating the actual attenuation factor distribution, and alternatively, may be a virtual attenuation factor distribution programmed for calculating the light source luminance. FIGS. 5 and 6 show an example in which the attenuation factor distribution $lsf^1$ is a Gaussian distribution.

As shown in FIG. 5, the look-up table LUTB includes a look-up table LUTB1 storing the square of the distance and a look-up table LUTB2 storing the attenuation factor. Contents and a reference method of the look-up table are the same as those of the look-up table LUTA.

Figure 8:
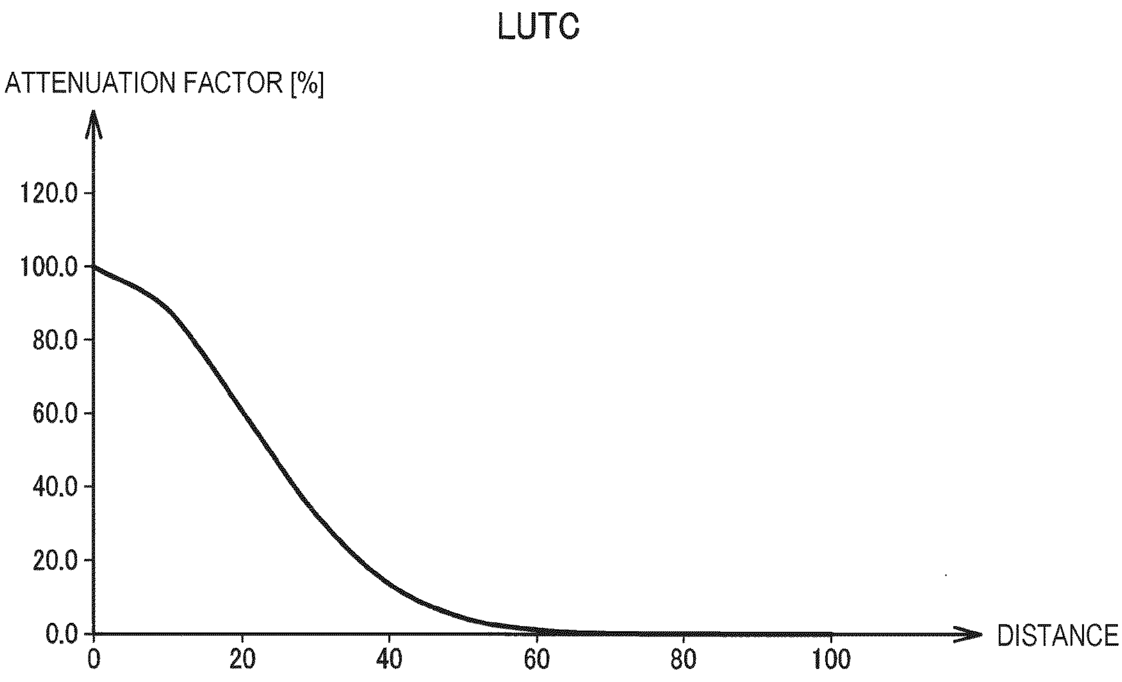
FIG. 8 is an example of an attenuation factor distribution in the look-up table LUTC.

FIG. 7 is an example of the look-up table LUTC. The look-up table LUTC is a table of an attenuation factor distribution $lsf^2$. FIG. 8 is an example of an attenuation factor distribution in the look-up table LUTC. The attenuation factor distribution $lsf^2$ is, for example, a distribution obtained by squaring an actual attenuation factor distribution and is a virtual attenuation factor distribution. However, the attenuation factor distribution $lsf^2$ is not limited to the distribution obtained by squaring the actual attenuation factor distribution, and may be any programmed distribution.

As shown in FIG. 7, the look-up table LUTC includes a look-up table LUTC1 storing the square of the distance and a look-up table LUTC2 storing the attenuation factor. Contents and a reference method of the look-up table are the same as those of the look-up table LUTA.

The attenuation factor distribution in the look-up table LUTB has a higher degree of attenuation with respect to the distance than the attenuation factor distribution in the look-up table LUTA. The attenuation factor distribution in the look-up table LUTC has a higher degree of attenuation with respect to the distance than the attenuation factor distribution in the look-up table LUTB. An expression "the degree of attenuation with respect to the distance is high" means that a distance at which the attenuation factor decreases to a predetermined attenuation factor in the attenuation factor distribution is short. The predetermined attenuation factor may be any attenuation factor, and is, for example, an attenuation factor within a range of 50% to 0%. Alternatively, "the degree of attenuation with respect to the distance is high" means that a decrease in the attenuation factor with respect to a distance change in a direction in which the distance increases is large. Alternatively, "the degree of attenuation with respect to the distance is high" means that spread of light represented by the attenuation factor distribution is relatively narrow. FIGS. 3 to 8 show the attenuation factor distribution that smoothly changes with respect to the distance, and alternatively, the attenuation factor distribution may change stepwise with respect to the distance.

FIGS. 3, 5, and 7 show one-dimensional look-up tables, and alternatively, a two-dimensional look-up table may be used as shown in FIG. 9. FIG. 9 shows an example of a two-dimensional look-up table of the attenuation factor distribution $lsf^1$, and the two-dimensional look-up table is similarly used for the attenuation factor distributions $lsf^0$ and $lsf^2$. In FIG. 9, an x distance is a distance in a horizontal scanning direction of the display panel, and a y distance is a distance in a vertical scanning direction of the display panel. The look-up table in FIG. 9 shows an attenuation factor distribution corresponding to ¼ of an xy plane with a position of a light source element serving as an origin. If the x distance and the y distance are absolute values of the distance, the look-up table can be applied symmetrically to the remaining ¾ of the xy plane. In the two-dimensional look-up table, the square of the distance may be used as in the one-dimensional look-up table. The one-dimensional look-up table shows a rotationally symmetric attenuation factor distribution, whereas the two-dimensional look-up table may be a table of a non-rotationally symmetric attenuation factor distribution.

Figure 10:
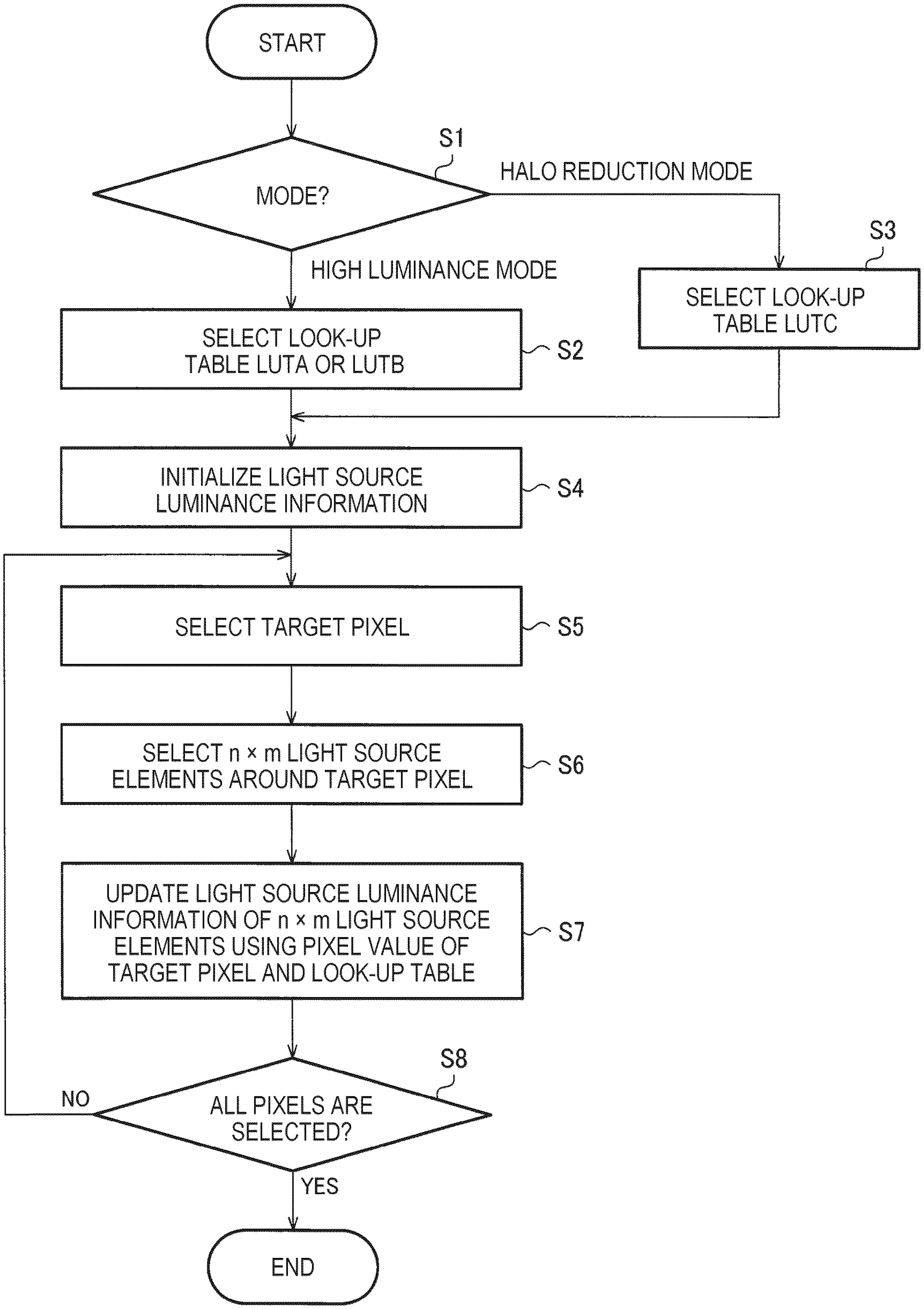
FIG. 10 is a flow of processing performed by a light source luminance determination circuit.

FIG. 10 is a flow of processing performed by the light source luminance determination circuit.

In step S1, the light source luminance determination circuit 140 checks a set mode. When the mode is the high luminance mode, the light source luminance determination circuit 140 selects the look-up table LUTA or LUTB in step S2. When the mode is the halo reduction mode, the light source luminance determination circuit 140 selects the look-up table LUTC in step S3. That is, in the halo reduction mode, the look-up table of the attenuation factor distribution having a high degree of attenuation with respect to the distance is selected. When the balanced mode is further provided, the LUTA may be selected in the high luminance mode, the LUTB may be selected in the balanced mode, and the LUTC may be selected in the halo reduction mode.

The mode may be automatically set according to, for example, ambient luminance. That is, an optical sensor may be mounted on an electronic device, a moving body, or the like where the display system 400 is mounted, the processing apparatus 300 may transmit the mode setting to the circuit apparatus 100 based on a detection signal of the optical sensor, and the light source luminance determination circuit 140 may select the look-up table based on the mode setting. For example, the high luminance mode may be selected in an environment brighter than certain luminance, and the halo reduction mode may be set in an environment darker than the certain luminance. Alternatively, the mode may be manually set by a user operation according to the ambient luminance. That is, a user of the electronic device, the moving body, or the like where the display system 400 is mounted may set the mode according to the ambient luminance through an operation unit (not shown), and the processing apparatus 300 may transmit the mode setting to the circuit apparatus 100. For example, when the display system 400 is mounted on an automobile, the mode may be selected in conjunction with an on-and-off operation on a headlight. Alternatively, the mode may be set based on any user operation regardless of the ambient luminance.

In step S4, the light source luminance determination circuit 140 initializes the light source luminance information. For example, luminance values of all light sources are initialized to zero.

S5, In step the light source luminance determination circuit 140 selects one pixel from pixels in the image data IMA. The selected pixel is referred to as a target pixel. In a loop from step S5 to step S8, target pixels are sequentially selected. For example, when a first pixel on a first scanning line of the image data IMA is selected in first step S5, a second pixel, a third pixel, . . . are selected sequentially in subsequent steps S5, and when all pixels on the first scanning line are selected, pixels on a second scanning line are selected sequentially, and so on until a last scanning line.

Figure 11:
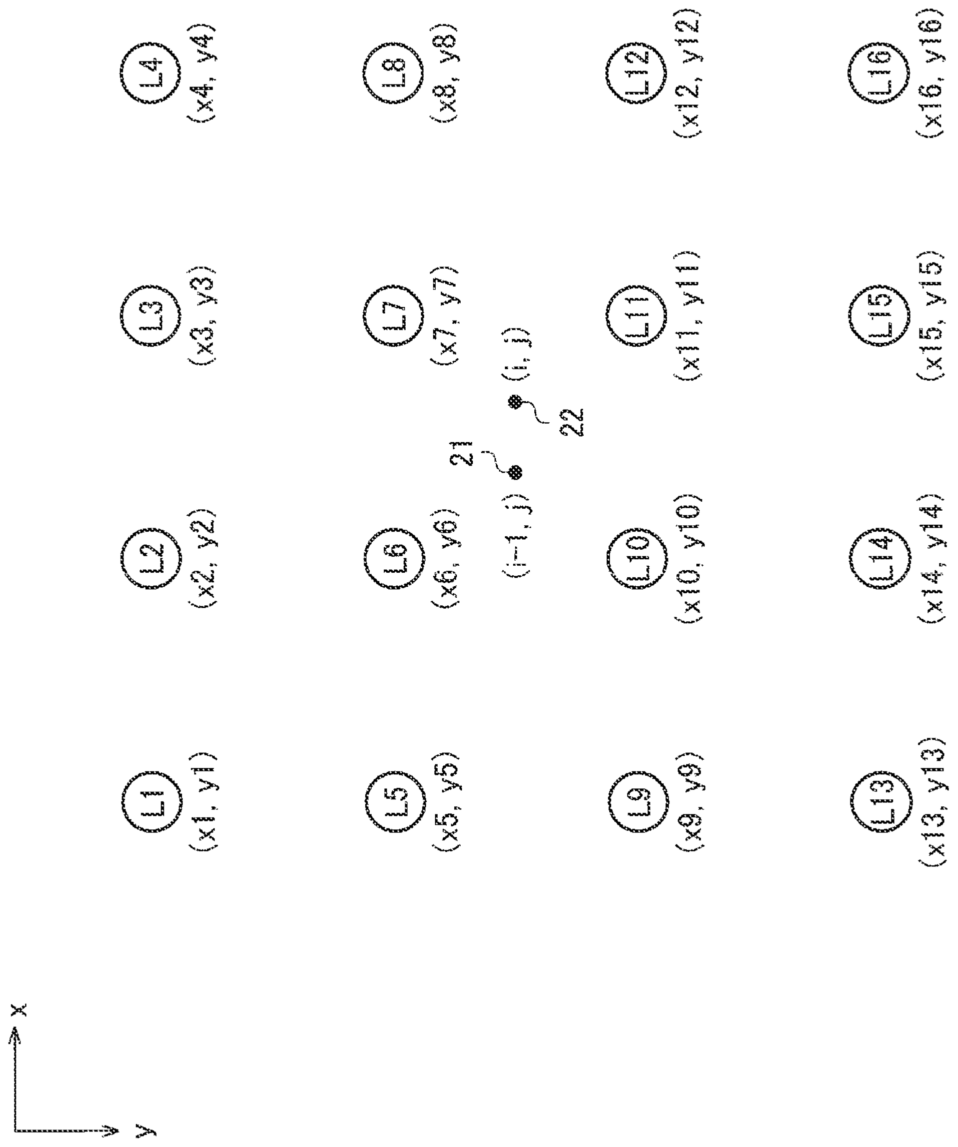
FIG. 11 is an example of surrounding light source elements.

In step S6, the light source luminance determination circuit 140 selects n×m light source elements around the target pixel. The n×m light source elements are also referred to as surrounding light source elements. FIG. 11 shows an example of surrounding light source elements. Here, an example in which n=4 and m=4 is shown, and n and m may each be an integer of 2 or more. In FIG. 11, an x direction is the horizontal scanning direction of the display panel, and a y direction is the vertical scanning direction of the display panel.

A position of a target pixel 22 is (i, j). Each of i and j is an integer, and the position (i, j) indicates an i-th pixel on a j-th scanning line. The light source luminance determination circuit 140 selects light source elements L1 to L16 in nearest two columns in each of a +x direction and a −x direction and in nearest two rows in each of a +y direction and a −y direction with reference to the position (i, j). A position of a light source element Lk is represented by (xk, yk), in which k is an integer of 1 or more and 16 or less.

In step S7 in FIG. 10, light source luminance information for each of the n×m light source elements selected in step S6 is updated using a pixel value of the target pixel 22 in the image data IMA and the look-up table selected in step S2 or S3.

In step S8, the light source luminance determination circuit 140 determines whether all pixels are selected as target pixels, ends the processing when all pixels are selected, and returns to step S5 when there is any unselected pixel.

Update processing of the light source luminance information in step S7 will be described using the example in FIG. 11. By the following equations (1) and (2), the light source luminance determination circuit 140 obtains a required change amount $\Delta_{ij}$ indicating a change amount required for a light quantity received by the target pixel 22 from the light source elements L1 to L16.

$$\Delta_{ij} = INT_{ij} - \sum_{k=1}^{16} lsf(k) \times powc(k) \tag{1}$$

-continued $$lsf(k) = lsf\left((i - xk)^2 + (j - yk)^2\right) \tag{2}$$

In the equation (1), $INT_{ij}$ is a pixel intensity based on the pixel value of the target pixel 22 in the image data IMA. The pixel intensity is, for example, a luminance value calculated from RGB pixel values of the target pixel 22 or a maximum value among the RGB pixel values of the target pixel 22. As shown in the equation (2), lsf(k) is an attenuation factor of light with which the light source element Lk illuminates the target pixel 22, and is obtained from an actual attenuation factor distribution or an attenuation factor distribution approximating the actual attenuation factor distribution. The square of the distance is used as an argument in the equation (2), and alternatively, the distance may be used as the argument. When the look-up table LUTB is the actual attenuation factor distribution or the attenuation factor distribution approximating the actual attenuation factor distribution, the light source luminance determination circuit 140 obtains lsf(k) using the look-up table LUTB. Alternatively, the storage unit 170 may separately store a look-up table for calculating lsf(k) in addition to the look-up tables LUTA, LUTB, and LUTC, and the light source luminance determination circuit 140 may obtain lsf(k) using such a look-up table. Previous light source luminance information of the light source element Lk is represented by powc(k). The previous light source luminance information is light source luminance information calculated using a previous target pixel 21 selected one before the current target pixel 22. The previous target pixel 21 is a pixel at a position (i−1, j) one before the position (i, j) in the x direction.

The light source luminance determination circuit 140 distributes the required change amount $\Delta_{ij}$ to light source luminance information of the light source element Lk by the following equations (3) and (4) to update the light source luminance information. On a right side in the following equation (3), a denominator of a second term when $\Delta_{ij}>0$ is common regardless of k, and thus the required change amount $\Delta_{ij}$ is weighted by $lsf^x(k)$. Here, $lsf^x(k)$ is attenuation factor distribution information selected according to the mode. For example, in the flow in FIG. 10, x=0 or 1 is selected in the high luminance mode, and x=2 is selected in the halo reduction mode. Since the attenuation factor distribution attenuates faster as x increases, the required change amount $\Delta_{ij}$ is likely to be distributed to a light source element close to the target pixel 22, and the required change amount $\Delta_{ij}$ is unlikely to be distributed to a light source element far from the target pixel 22. Accordingly, light source luminance of a light source element far from a high luminance pixel is unlikely to be increased, and a halo reduction effect is obtained.

$$powu(k) = \begin{cases} powc(k) + \Delta_{ij} \dfrac{lsf^x(k)}{\sum_{\alpha=1}^{16} lsf^{x+1}(\alpha)}, & \text{if } \Delta_{ij} > 0 \\ powc(k), & \text{if } \Delta_{ij} \le 0 \end{cases} \tag{3}$$

$$lsf^x(k) = lsf^x\left((i - xk)^2 + (j - yk)^2\right) \tag{4}$$

In the equation (3), powu(k) is current light source luminance information, that is, the updated light source luminance information. As shown in the equation (4), $lsf^x(k)$ is an attenuation factor of light with which the light source element Lk illuminates the target pixel 22. The square of the distance is used as an argument in the equation (4), and alternatively, the distance may be used as the argument. Here, x is an integer of 0 or more. In the examples in FIGS. 3 to 8, x=0, 1, and 2. That is, the light source luminance determination circuit 140 obtains $lsf^0(k)$ by referring to the look-up table LUTA when x=0, obtains $lsf^1(k)$ by referring to the look-up table LUTB when x=1, and obtains $lsf^2(k)$ by referring to the look-up table LUTC when x=2. However, attenuation factor distribution information corresponding to x that is 3 or more may be used. Here, the attenuation factor distribution information $lsf^x(k)$ may be a virtual attenuation factor distribution. In addition, $lsf^1(k)$ may be an actual attenuation factor distribution or an attenuation factor distribution approximating the actual attenuation factor distribution, or may be a virtual attenuation factor distribution.

The light source luminance determination circuit 140 may update the light source luminance information by the following equation (5). In a denominator of a second term when $\Delta_{ij}>0$, $lsf^x(\alpha)^x lsf(\alpha)$ is calculated instead of $lsf^{x+1}(\alpha)$. When $lsf^x(\alpha)$ is not an x-th power of lsf but an attenuation factor distribution programmed as desired, there is a possibility that $lsf^{x+1} \neq lsf^x \times lsf$ is satisfied. In such a case, the light source luminance information may be updated by the following equation (5). Here, $lsf(\alpha)$ is obtained from an actual attenuation factor distribution or an attenuation factor distribution approximating the actual attenuation factor distribution.

$$powu(k) = \begin{cases} powc(k) + \Delta_{ij} \dfrac{lsf^x(k)}{\sum_{\alpha=1}^{16} lsf^x(\alpha) \times lsf(\alpha)}, & \text{if } \Delta_{ij} > 0 \\ powc(k), & \text{if } \Delta_{ij} \le 0 \end{cases} \tag{5}$$

3. Illumination Luminance Calculation Circuit

Figure 12:
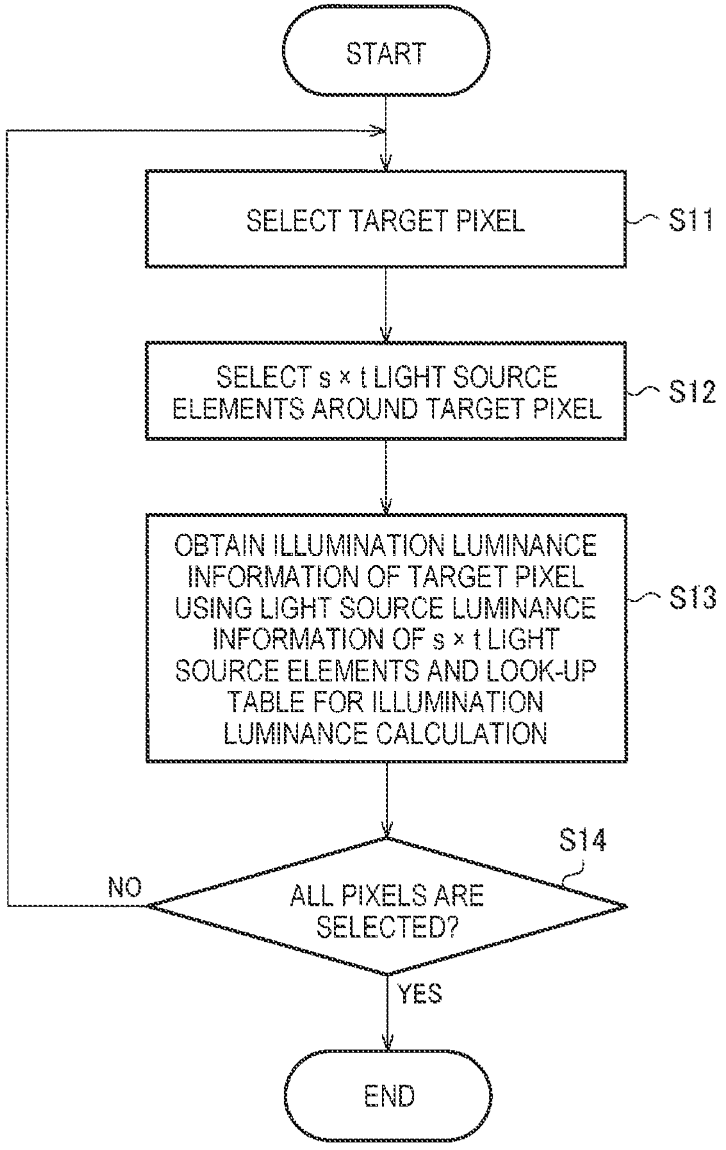
FIG. 12 is a flow of processing performed by an illumination luminance calculation circuit.

FIG. 12 is a flow of processing performed by the illumination luminance calculation circuit.

In step S11, the illumination luminance calculation circuit 150 selects one pixel from the pixels in the image data IMA. The selected pixel is referred to as a target pixel. In a loop from step S11 to step S14, target pixels are sequentially selected. For example, when the first pixel on the first scanning line of the image data IMA is selected in first step S11, the second pixel, the third pixel, . . . are selected sequentially in subsequent steps S11, and when all pixels on the first scanning line are selected, the pixels on the second scanning line are selected sequentially, and so on until the last scanning line.

In step S12, the illumination luminance calculation circuit 150 selects s×t light source elements around the target pixel. Each of s and t may be an integer of 2 or more. Here, s×t may be the same number as or a number different from n×m in FIG. 10. The illumination luminance information may be obtained from all light source elements instead of the s×t light source elements.

In step S13, the illumination luminance calculation circuit 150 obtains the illumination luminance information of the target pixel using the light source luminance information of the selected s×t light source elements and the look-up table for illumination luminance calculation. Specifically, the illumination luminance calculation circuit 150 obtains the illumination luminance information of the target pixel by the following equation (6).

$$PL(i, j) = \sum_{\beta=1}^{s \times t} pow(\beta) \times lsf(\beta) \tag{6}$$

In the equation (6), PL(i, j) is illumination luminance information relative to a pixel at the position (i, j). The light source luminance information determined by the light source luminance determination circuit 140 is represented by pow(β). That is, after the loop of steps S5 to S8 in FIG. 10 is executed up to a last pixel in the image data IMA, powu in the equation (3) or (5) is used as pow in the equation (6). Even when the loop of steps S5 to S8 is not executed up to the last pixel in the image data IMA, update of light source luminance information of each light source element is sequentially completed as the target pixel advances, and thus the light source luminance information whose update is completed may be used as pow. Here, lsf(β) is obtained from an actual attenuation factor distribution or an attenuation factor distribution approximating the actual attenuation factor distribution. When the look-up table LUTB is the actual attenuation factor distribution or the attenuation factor distribution approximating the actual attenuation factor distribution, the illumination luminance calculation circuit 150 obtains lsf(β) using the look-up table LUTB. Alternatively, the storage unit 170 may separately store a look-up table for calculating lsf(β) in addition to the look-up tables LUTA, LUTB, and LUTC, and the illumination luminance calculation circuit 150 may obtain lsf(β) using such a look-up table.

In step the S14, illumination luminance calculation circuit 150 determines whether all pixels are selected as target pixels, ends the processing when all pixels are selected, and returns to step S11 when there is any unselected pixel.

The circuit apparatus 100 according to the embodiment described above controls the display apparatus 200 including the plurality of light source elements and the display panel 220. The circuit apparatus 100 includes the storage unit 170 and the light source luminance determination circuit 140. The storage unit 170 stores a plurality of pieces of attenuation factor distribution information indicating an attenuation factor distribution of light with respect to a distance between a light source element and a pixel. The light source luminance determination circuit 140 determines, by light adjustment processing based on input image data and the plurality of pieces of attenuation factor distribution information, light source luminance information indicating luminance of light emitted by each light source element of the plurality of light source elements. In a first mode, the light source luminance determination circuit 140 determines the light source luminance information based on the input image data and first attenuation factor distribution information among the plurality of pieces of attenuation factor distribution information. In a second mode, the light source luminance determination circuit 140 determines the light source luminance information based on the input image data and second attenuation factor distribution information among the plurality of pieces of attenuation factor distribution information. An attenuation factor distribution in the second attenuation factor distribution information is different from an attenuation factor distribution in the first attenuation factor distribution information.

According to the embodiment, the light source luminance information is determined based on the attenuation factor distribution according to the mode. In local dimming, each light source element is subjected to light adjustment according to luminance of the input image data, and a light adjustment result can be changed by changing the attenuation factor distribution used for the light adjustment. That is, even when the luminance of the light source element is changed, there is no influence on a pixel where light from the light source element does not reach, and the light source element is subjected to light adjustment based on pixel data of a pixel in a range where the light from the light source element reaches. The attenuation factor distribution indicates diffusion of the light from the light source element, and by changing the attenuation factor distribution, it is possible to change how far the light is regarded as reaching from the light source element. According to the embodiment, since the light adjustment is changed by changing the attenuation factor distribution information according to the mode, it is possible to select optimal light adjustment for display contents, an environment, or the like by selecting the mode.

In the example in FIG. 2, the input image data corresponds to the image data IMA. In the example in FIG. 10, the first mode corresponds to the high luminance mode, the first attenuation factor distribution information corresponds to the look-up table LUTA or LUTB, the second mode corresponds to the halo reduction mode, and the second attenuation factor distribution information corresponds to the look-up table LUTC. However, the first mode and the second mode may be any mode. For example, the first mode may be the balanced mode, and the second mode may be the halo reduction mode. Alternatively, the first mode may be the high luminance mode, and the second mode may be the balanced mode. The attenuation factor distribution information is not limited to the look-up table, and may be the function information as described above.

In the embodiment, the first attenuation factor distribution information is a first look-up table to which the distance is input. The second attenuation factor distribution information is a second look-up table to which the distance is input.

According to the embodiment, in the first mode, the light source luminance determination circuit 140 can determine the light source luminance information based on the first attenuation factor distribution information by referring to the first look-up table obtained by converting a first attenuation factor distribution into a table. In the second mode, the light source luminance determination circuit 140 can determine the light source luminance information based on the second attenuation factor distribution information by referring to the second look-up table obtained by converting a second attenuation factor distribution into a table.

In the embodiment, the first mode is the high luminance mode in which display is performed with higher luminance than that in the second mode, and the second mode is the halo reduction mode in which occurrence of halo is reduced as compared to the first mode.

According to the embodiment, it is possible to display the display contents with high luminance by selecting the first mode. On the other hand, by selecting the second mode, light emission luminance of the light source element can be reduced and halo can be reduced in a situation where a bright portion and a dark portion are adjacent to each other and halo is likely to occur. Accordingly, by selecting the mode in view of a trade-off between reduction of halo and reduction of luminance for illuminating the display panel, it is possible to perform optimal light adjustment for the display contents, the environment, or the like.

In the embodiment, the attenuation factor distribution in the second attenuation factor distribution information has a higher degree of attenuation of light with respect to the distance than the attenuation factor distribution in the first attenuation factor distribution information.

An attenuation factor distribution with a high degree of attenuation means that light is less likely to reach a pixel distant from the light source element than an attenuation factor distribution with a low degree of attenuation. Since the light source element is subjected to light adjustment based on pixel data of a pixel in a range where light from the light source element reaches, luminance of a light source element far from a high luminance pixel is unlikely to be increased when the attenuation factor distribution having a high degree of attenuation is used. Accordingly, in the halo reduction mode, the luminance of the light source element far from the high luminance pixel is unlikely to be increased, thus a dark portion around the high luminance pixel is unlikely to be irradiated with light, and thus halo is reduced.

In the embodiment, the first mode and the second mode are modes set according to ambient luminance.

Appropriate light adjustment varies depending on the ambient luminance. That is, in a bright environment such as outdoors in daytime, halo is inconspicuous, and it is necessary to perform display with high luminance. On the other hand, in a dark environment such as shade or nighttime, halo is likely to be conspicuous, and the display may be performed with relatively low luminance. According to the embodiment, since the mode is set according to the ambient: light can be appropriately adjusted according to the ambient luminance.

In the embodiment, an example in which the same mode is set in all areas of the display panel is described, but the disclosure is not limited thereto. That is, the first mode may be set in a first area of the display panel, and the second mode may be set in a second area different from the first area of the display panel.

Specifically, the storage unit 170 stores information for defining an area and information on a mode setting of each area. Such information may be written from the processing apparatus 300 to the storage unit 170 or, when the storage unit 170 includes a non-volatile memory, the information may be written in the non-volatile memory in advance. The light source luminance determination circuit 140 determines an area to which the target pixel belongs based on the information stored in the storage unit 170, reads attenuation factor distribution information of a mode set in the area from the storage unit 170, and determines light source luminance information using the attenuation factor distribution information.

According to the embodiment, it is possible to select, according to an area of the display panel, light adjustment optimal for display contents or the like in the area. For example, the halo reduction mode may be set in an area where a high luminance character, icon, or the like is displayed in a dark portion, and the high luminance mode may be set in an area in which an image where halo is relatively unlikely to appear such as a navigation screen is displayed. Alternatively, even in an area in which a high luminance character, icon, or the like is displayed, the high luminance mode may be set in an area in which an important character or icon is displayed, and the halo reduction mode may be set in an area in which a less important character or icon is displayed.

In the embodiment, as described in the equation (1), the light source luminance determination circuit 140 obtains, based on the pixel value of the target pixel in the input image data and the previous light source luminance information powc(k), the required change amount $\Delta_{ij}$ of the luminance for illuminating the target pixel of the display panel 220. As described in the equation (3) or (5), in the first mode, the light source luminance determination circuit 140 obtains the current light source luminance information powu(k) by updating the previous light source luminance information powc(k) based on the required change amount $\Delta_{ij}$ and the first attenuation factor distribution information. In the second mode, the light source luminance determination circuit

140 obtains the current light source luminance information powu(k) by updating the previous light source luminance information powc(k) based on the required change amount $\Delta_{ij}$ and the second attenuation factor distribution information.

Specifically, in the first mode, the light source luminance determination circuit 140 distributes the required change amount $\Delta_{ij}$ to surrounding light source elements, which are light source elements disposed around the target pixel, by weighting based on the first attenuation factor distribution information, thereby updating light source luminance of the surrounding light source elements. In the second mode, the light source luminance determination circuit 140 distributes the required change amount $\Delta_{ij}$ to the surrounding light source elements by weighting based on the second attenuation factor distribution information, thereby updating the light source luminance of the surrounding light source elements.

For example, when the high luminance mode is set as the first mode in the flow in FIG. 10, the look-up table LUTA or LUTB is selected in the first mode. That is, in the equation (3) or (5), x=0 or 1, and the first attenuation factor distribution information is $lsf^0$ or $lsf^1$. At this time, the required change amount $\Delta_{ij}$ is distributed to the light source element Lk by weighting based on $lsf^0(k)$ or $lsf^1$ (k). When the halo reduction mode is set as the second mode, the look-up table LUTC is selected in the second mode. That is, in the equation (3) or (5), x=2, and the second attenuation factor distribution information is $lsf^2$. At this time, the required change amount $\Delta_{ij}$ is distributed to the light source element Lk by weighting based on $lsf^2(k)$.

According to the embodiment, the required change amount $\Delta_{ij}$ is distributed to the light source elements around the target pixel by weighting based on the attenuation factor distribution according to the mode. Accordingly, in the case of an attenuation factor distribution in which spread of light is large, the required change amount $\Delta_{ij}$ is distributed to a light source element far from the target pixel, and luminance is likely to be increased. In the case of an attenuation factor distribution in which spread of light is small, the required change amount $\Delta_{ij}$ is unlikely to be distributed to the light source element far from the target pixel, and the luminance is unlikely to be increased. The former case is light adjustment emphasizing luminance of a light source, and thus corresponds to the high luminance mode. The latter case is light adjustment in which luminance of a light source element distant from a high luminance display object is unlikely to be increased, and thus corresponds to the halo reduction mode.

In the embodiment, as shown in the equation (3) or (5), when the required change amount $\Delta_{ij}$ is zero or negative, the light source luminance determination circuit 140 sets the previous light source luminance information powc(k) as the current light source luminance information powu(k) without updating.

For example, in a case where pixels having the same luminance are continuous, when the light source luminance information is repeatedly updated and luminance becomes sufficient, the required change amount $\Delta_{ij}$ is zero thereafter. When the required change amount $\Delta_{ij}$ is zero, there is no point in updating the light source luminance information using the required change amount $\Delta_{ij}$. When there is a low luminance pixel after light adjustment on a high luminance pixel, the required change amount $\Delta_{ij}$ is negative. When updating with the negative required change amount $\Delta_{ij}$, light source luminance is lowered, then light source luminance adjusted according to a high luminance pixel is lowered, resulting in an insufficient light quantity. By not updating the light source luminance information when the required change amount $\Delta_{ij}$ is negative, the insufficient light quantity can be prevented.

In the embodiment, the light source luminance determination circuit 140 obtains the current light source luminance information powu(k) for the n×m light source elements based on the previous light source luminance information powc(k) for the n×m light source elements disposed around the target pixel.

According to the embodiment, by limiting a target of update processing to the n×m light source elements disposed around the target pixel, a processing load can be reduced as compared to the case where the light source luminance information is updated for all light source elements of the backlight 210 as the target.

In the embodiment, the circuit apparatus 100 includes the illumination luminance calculation circuit 150 and the color correction circuit 160. Based on the attenuation factor distribution information for illumination luminance calculation among a plurality of pieces of attenuation factor distribution information and the light source luminance information pow(β) determined by the light source luminance determination circuit 140, the illumination luminance calculation circuit 150 calculates the illumination luminance information PL(i, j) indicating the luminance at which the target pixel of the display panel 220 is illuminated by the plurality of light source elements. The color correction circuit 160 performs color correction on the input image data based on the illumination luminance information PL(i, j).

According to the embodiment, while the light source luminance determination circuit 140 uses the attenuation factor distribution information corresponding to the mode, after the light source luminance information is determined, the illumination luminance calculation circuit 150 calculates illumination luminance of each pixel using the attenuation factor distribution information for illumination luminance calculation. Accordingly, based on an actual attenuation factor distribution or an attenuation factor distribution approximating the actual attenuation factor distribution, luminance of light actually reaching each pixel or luminance approximating the actual luminance is calculated. Accordingly, color correction independent of the mode is executed.

In the embodiment, in a third mode, the light source luminance determination circuit 140 may determine the light source luminance information based on the input image data and third attenuation factor distribution information among a plurality of pieces of attenuation factor distribution information. An attenuation factor distribution in the third attenuation factor distribution information is different from the attenuation factor distribution in the first attenuation factor distribution information and the attenuation factor distribution in the second attenuation factor distribution information.

For example, the first mode may be the high luminance mode, the second mode may be the halo reduction mode, and the third mode may be the balanced mode. At this time, the first attenuation factor distribution information may correspond to the look-up table LUTA, the second attenuation factor distribution information may correspond to the look-up table LUTC, and the third attenuation factor distribution information may correspond to the look-up table LUTB.

According to the embodiment, since it is possible to select modes of multiple stages, it is possible to further perform optimal light adjustment for the display contents, the environment, or the like.

In the embodiment, the display apparatus 200 may be a head-up display, a meter panel, a center information display, or an electronic mirror.

A head-up display, a meter panel, a center information display, or an electronic mirror is mounted on a moving body such as an automobile. Therefore, the environment changes along with a movement of the moving body or a change in time, and various display contents are displayed along with provision of information to the user. According to the embodiment, since it is possible to perform light adjustment according to the mode, it is possible to perform optimal light adjustment for the display contents, the environment, or the like.

Although the embodiment has been described in detail above, it can be easily understood by those skilled in the art that many modifications are possible without substantially departing from the novel matters and effects of the present disclosure. Accordingly, all such modifications are within the scope of the present disclosure. For example, a term described at least once together with a different term having a broader meaning or the same meaning in the description or the drawings can be replaced with the different term at any place in the description or the drawings. All combinations of the embodiment and the modifications are also within the scope of the present disclosure. The configurations and operations of the circuit apparatus, the backlight, the display apparatus, the display system, the processing apparatus, the electronic device, and the like are not limited to those described in the embodiment, and various modifications are possible.

What is claimed is:

1. A circuit apparatus that controls a display apparatus including a plurality of light source elements and a display panel, the circuit apparatus comprising:

a memory configured to store a plurality of pieces of attenuation factor distribution information indicating an attenuation factor distribution of light with respect to a distance between each of the plurality of light source elements and a pixel; and a light source luminance determination circuit configured to determine, by light adjustment processing based on input image data and the plurality of pieces of attenuation factor distribution information, light source luminance information indicating luminance of light emitted by each light source element of the plurality of light source elements, wherein in a first mode, the light source luminance determination circuit determines the light source luminance information based on the input image data and first attenuation factor distribution information among the plurality of pieces of attenuation factor distribution information, in a second mode, the light source luminance determination circuit determines the light source luminance information based on the input image data and second attenuation factor distribution information in which the attenuation factor distribution is different from that in the first attenuation factor distribution information among the plurality of pieces of attenuation factor distribution information, the first mode is a high luminance mode in which display is performed with higher luminance than that in the second mode, the second mode is a halo reduction mode in which occurrence of halo is reduced as compared to the first mode, and the attenuation factor distribution in the second attenuation factor distribution information has a higher degree of attenuation of light with respect to the distance than the attenuation factor distribution in the first attenuation factor distribution information.

2. The circuit apparatus according to claim 1, wherein the first attenuation factor distribution information is a first look-up table to which the distance is input, and the second attenuation factor distribution information is a second look-up table to which the distance is input.

3. The circuit apparatus according to claim 1, wherein the first mode and the second mode are modes set according to ambient luminance.

4. The circuit apparatus according to claim 1, wherein the first mode is set in a first area of the display panel, and the second mode is set in a second area different from the first area of the display panel.

5. The circuit apparatus according to claim 1, further comprising:

an illumination luminance calculation circuit configured to calculate, based on attenuation factor distribution information for illumination luminance calculation among the plurality of pieces of attenuation factor distribution information and the light source luminance information determined by the light source luminance determination circuit, illumination luminance information indicating luminance at which a target pixel of the display panel is illuminated by the plurality of light source elements; and a color correction circuit configured to perform color correction on the input image data based on the illumination luminance information.

6. The circuit apparatus according to claim 1, wherein in a third mode, the light source luminance determination circuit determines the light source luminance information based on the input image data and third attenuation factor distribution information in which the attenuation factor distribution is different from those in the first attenuation factor distribution information and the second attenuation factor distribution information among the plurality of pieces of attenuation factor distribution information.

7. The circuit apparatus according to claim 1, wherein the display apparatus is a head-up display, a meter panel, a center information display, or an electronic mirror.

8. A display system comprising:

the circuit apparatus according to claim 1; and the display apparatus.

9. The circuit apparatus according to claim 1, wherein the light source luminance determination circuit obtains, based on a pixel value of a target pixel in the input image data and previous light source luminance information, a required change amount of luminance for illuminating the target pixel of the display panel, in the first mode, the light source luminance determination circuit obtains current light source luminance information by updating the previous light source luminance information based on the required change amount of luminance and the first attenuation factor distribution information, and in the second mode, the light source luminance determination circuit obtains the current light source luminance information by updating the previous light source luminance information based on the required change amount of luminance and the second attenuation factor distribution information.

10. The circuit apparatus according to claim 9, wherein in the first mode, the light source luminance determination circuit distributes the required change amount of luminance to surrounding light source elements, which are light source elements disposed around the target pixel, by weighting based on the first attenuation factor distribution information, thereby updating light source luminance of the surrounding light source elements, and in the second mode, the light source luminance determination circuit distributes the required change amount of luminance to the surrounding light source elements by weighting based on the second attenuation factor distribution information, thereby updating the light source luminance of the surrounding light source elements.

11. The circuit apparatus according to claim 9, wherein when the required change amount of luminance is zero or negative, the light source luminance determination circuit sets the previous light source luminance information as the current light source luminance information without updating.

12. The circuit apparatus according to claim 9, wherein the light source luminance determination circuit obtains, based on the previous light source luminance information relative to n×m light source elements disposed around the target pixel, the current light source luminance information relative to the n×m light source elements.

13. A circuit apparatus that controls a display apparatus including a plurality of light source elements and a display panel, the circuit apparatus comprising:

a memory configured to store a plurality of pieces of attenuation factor distribution information indicating an attenuation factor distribution of light with respect to a distance between each of the plurality of light source elements and a pixel; and a light source luminance determination circuit configured to determine, by light adjustment processing based on input image data and the plurality of pieces of attenuation factor distribution information, light source luminance information indicating luminance of light emitted by each light source element of the plurality of light source elements, wherein in a first mode, the light source luminance determination circuit determines the light source luminance information based on the input image data and first attenuation factor distribution information among the plurality of pieces of attenuation factor distribution information, in a second mode, the light source luminance determination circuit determines the light source luminance information based on the input image data and second attenuation factor distribution information in which the attenuation factor distribution is different from that in the first attenuation factor distribution information among the plurality of pieces of attenuation factor distribution information, the light source luminance determination circuit obtains, based on a pixel value of a target pixel in the input image data and previous light source luminance information, a required change amount of luminance for illuminating the target pixel of the display panel, in the first mode, the light source luminance determination circuit obtains current light source luminance information by updating the previous light source luminance information based on the required change amount of luminance and the first attenuation factor distribution information, and in the second mode, the light source luminance determination circuit obtains the current light source luminance information by updating the previous light source luminance information based on the required change amount of luminance and the second attenuation factor distribution information.

14. The circuit apparatus according to claim 13, wherein in the first mode, the light source luminance determination circuit distributes the required change amount of luminance to surrounding light source elements, which are light source elements disposed around the target pixel, by weighting based on the first attenuation factor distribution information, thereby updating light source luminance of the surrounding light source elements, and in the second mode, the light source luminance determination circuit distributes the required change amount of luminance to the surrounding light source elements by weighting based on the second attenuation factor distribution information, thereby updating the light source luminance of the surrounding light source elements.

15. The circuit apparatus according to claim 13, wherein when the required change amount of luminance is zero or negative, the light source luminance determination circuit sets the previous light source luminance information as the current light source luminance information without updating.

16. The circuit apparatus according to claim 13, wherein the light source luminance determination circuit obtains, based on the previous light source luminance information relative to n×m light source elements disposed around the target pixel, the current light source luminance information relative to the n×m light source elements.

17. The circuit apparatus according to claim 13, wherein the first attenuation factor distribution information is a first look-up table to which the distance is input, and the second attenuation factor distribution information is a second look-up table to which the distance is input.

18. The circuit apparatus according to claim 13, wherein the first mode and the second mode are modes set according to ambient luminance.

19. The circuit apparatus according to claim 13, wherein the first mode is set in a first area of the display panel, and the second mode is set in a second area different from the first area of the display panel.

20. The circuit apparatus according to claim 13, wherein the display apparatus is a head-up display, a meter panel, a center information display, or an electronic mirror.

* * * * *